United States Patent
Mulcahy et al.

Patent Number: 6,002,746
Date of Patent: Dec. 14, 1999

[54] LINE TESTING IN A TELECOMMUNICATIONS NETWORK

[75] Inventors: Chris Mulcahy, Ipswich; John C. D. Tooze, Colchester, both of United Kingdom

[73] Assignee: British Telecommunications public limited company, London, United Kingdom

[21] Appl. No.: 08/890,444

[22] Filed: Jul. 9, 1997

[30] Foreign Application Priority Data

Apr. 16, 1997 [EP] European Pat. Off. .............. 97302614

[51] Int. Cl.$^6$ .............................. H04M 1/24; H04M 3/08; H04M 3/22

[52] U.S. Cl. ................................ 379/22; 379/29; 379/32

[58] Field of Search ................... 379/1, 10, 12, 379/14, 16, 18, 22–23, 25, 31, 34, 32, 9, 27, 29

[56] References Cited

U.S. PATENT DOCUMENTS

| | | | |
|---|---|---|---|
| 4,670,898 | 6/1987 | Pierce et al. | 379/22 |
| 4,764,949 | 8/1988 | Faith et al. | 379/9 |
| 5,355,405 | 10/1994 | Bernstein | 379/6 |
| 5,687,212 | 11/1997 | Kinser, Jr. et al. | 379/34 |
| 5,799,060 | 8/1998 | Kennedy et al. | 379/29 |
| 5,857,011 | 1/1999 | Kennedy et al. | 379/32 |

FOREIGN PATENT DOCUMENTS

| | | |
|---|---|---|
| 0589248 | 8/1993 | European Pat. Off. . |
| 0700193 | 3/1996 | European Pat. Off. . |
| 3512787 | 4/1985 | Germany . |
| WO 87/06421 | 10/1987 | WIPO . |
| WO 89/03622 | 4/1989 | WIPO . |
| WO 95/07588 | 3/1995 | WIPO . |
| WO 97/10666 | 3/1997 | WIPO . |

OTHER PUBLICATIONS

Smith, "Keeping the Records Straight", British Telecommunications Engineering, vol. 10, No. Part 01, Apr. 1, 1991, pp. 71–74.

*Primary Examiner*—Curtis A. Kuntz
*Assistant Examiner*—Binh K. Tieu
*Attorney, Agent, or Firm*—Nixon & Vanderhye P.C.

[57] ABSTRACT

A centralized test apparatus is provided for a telecommunications network which includes local switches and a core network. Each local switch is connected through terminating lines to terminal equipment such as telephone instruments. The test apparatus enables a field engineer to record routing data in a centralized database. When a field engineer connects a telephone instrument to a terminating line in a node in an access network, the engineer can dial the number of the test apparatus. The test apparatus retrieves the calling line identity on answering the call. It then invites the field engineer to enter an identifier for the type of node, the number of the node and the number of a terminal inside the node through which the terminating line passes. The calling line identity, the type of node, the number of the node and the number of the terminal are then used to update routing data in the database. Thus is provided a method of updating and maintaining routing data.

11 Claims, 8 Drawing Sheets

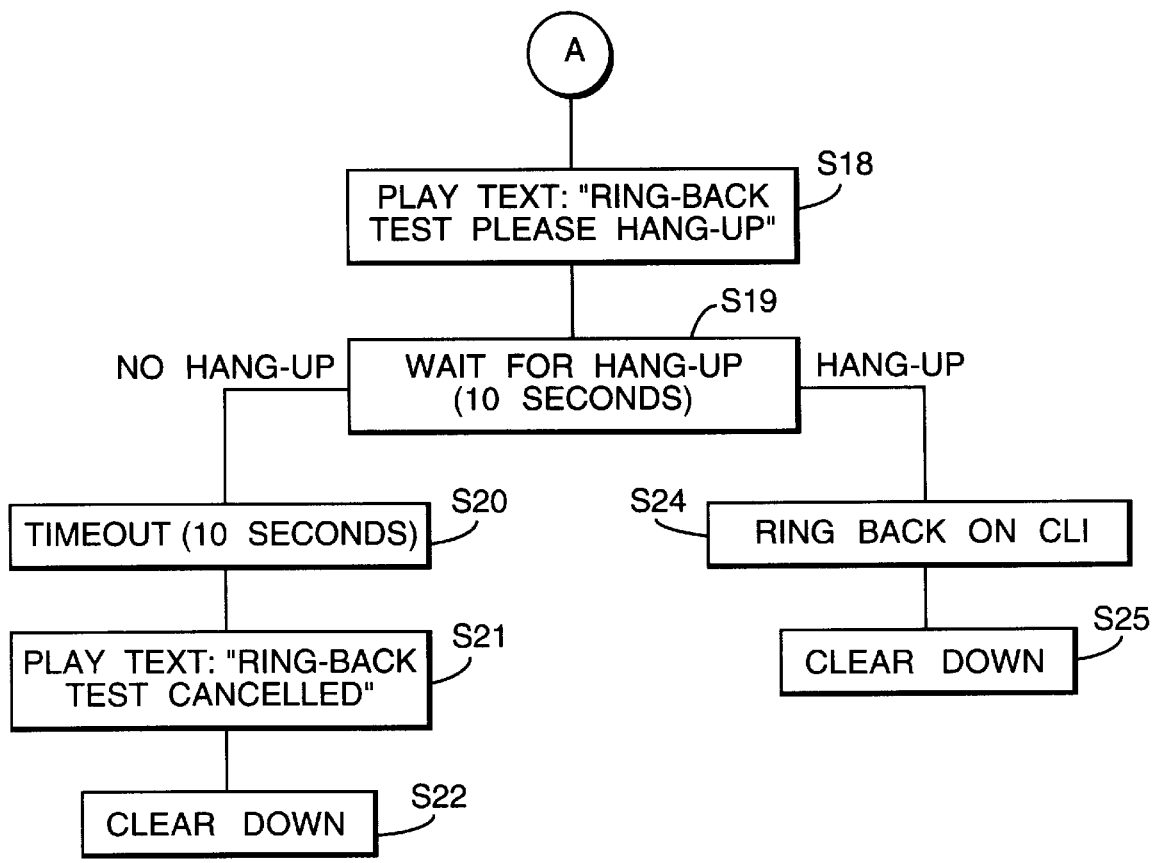
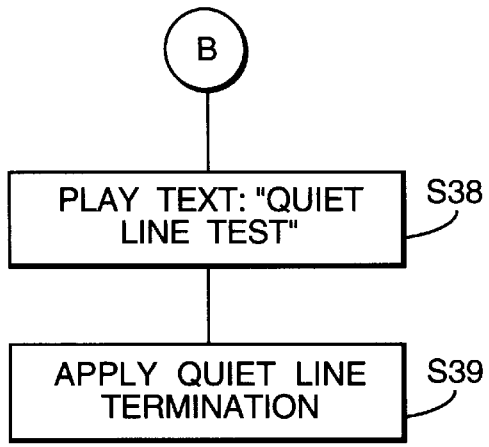

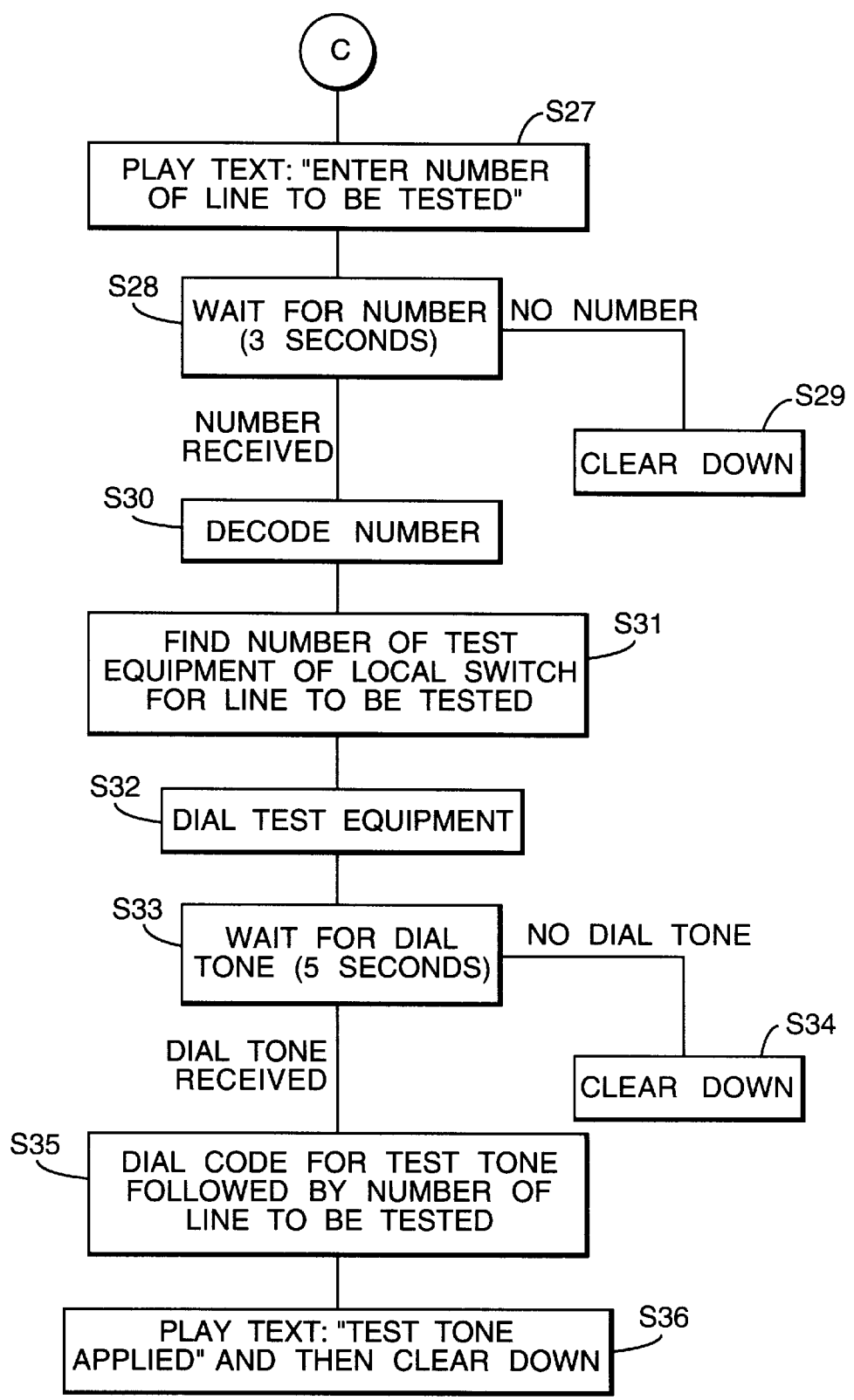

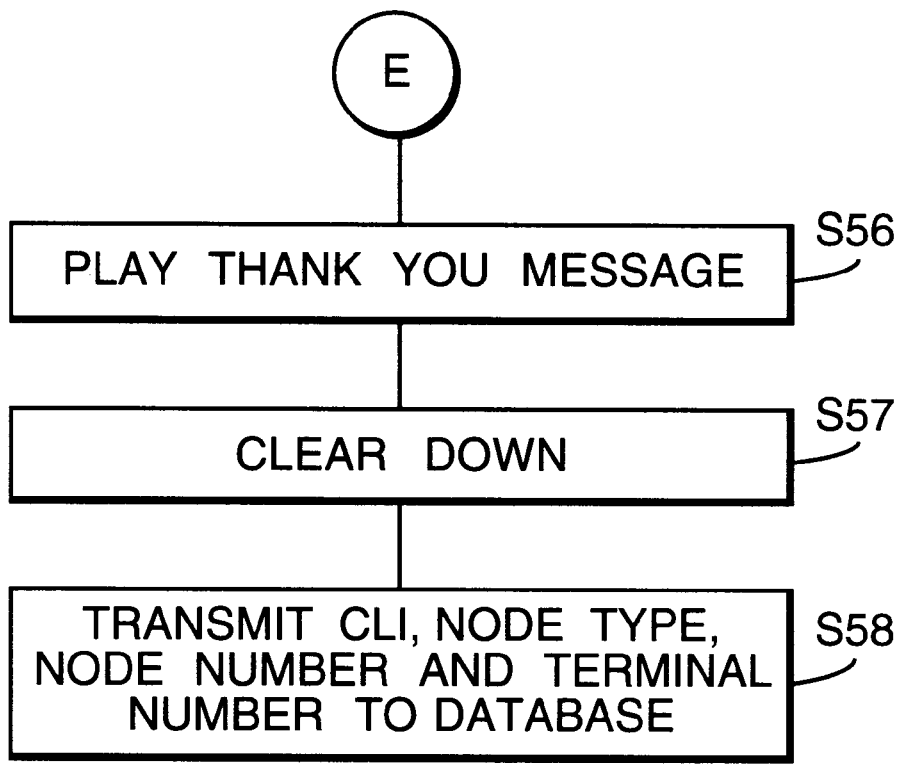
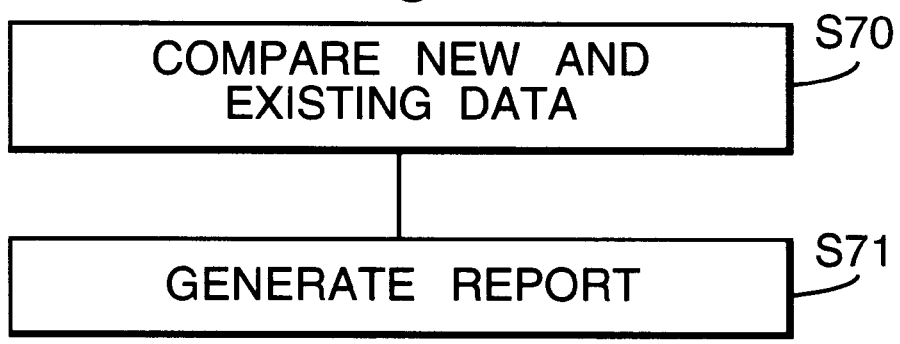

LINE TESTING IN A TELECOMMUNICATIONS NETWORK

BACKGROUND OF THE INVENTION

1. Field of the Invention

This invention relates to a method of, and an apparatus for, maintaining routing data an a telecommunications network.

2. Related Art

In an access network of a telecommunications network, a local switch is connected to the terminating lines of the access network and the far ends of these lines are connected to terminal equipment, such as telephone instruments located in customers' premises. Between the local switch and terminal equipment, each terminating line typically passes through several nodes, such as the main distribution frame of the local switch, primary and secondary cross-connect points and distribution points. Each line passes through terminals within the nodes. It is known to maintain a routing table for an access network in which the number of each line is recorded against identifiers for the terminals in the nodes through which the line passes. Such a routing table is used for line provision, maintenance and repair. Unfortunately, due to human error in recording the data, such routing tables are often not accurate. Inaccuracy in such tables increases the cost of repairing and maintaining lines. Also, inaccuracies in data on unassigned lines can lead to unnecessary costs in line provision.

SUMMARY OF THE INVENTION

According to a first aspect of this invention there is provided a method of maintaining routing data in a telecommunications network which comprises at least one switch and a test apparatus having a predefined telephone number, said method comprising the steps of:

dialling the predefined telephone number of said test apparatus from a telephone instrument connected to a terminal in a node of a telephone line;

said test apparatus retrieving the calling line identity of the line from which the call is made;

said test apparatus inviting the user of said telephone instrument to enter an identifier for a terminal through which said telephone line passes;

said user entering an identifier for a terminal through which said telephone line passes; and said test apparatus storing the calling line identity and the terminal identifier in a database.

The invention provides a method of updating and maintaining routing data, thereby reducing inaccuracies in such data.

According to a second aspect of this invention there is provided, in a telecommunications network comprising at least one switch arranged to make connections between terminating lines connected to said at least one switch, a test apparatus having a predefined telephone number and database, said test apparatus comprising:

means for answering a call, said call answering means being arranged to retrieve the calling line identity of the line from which the call is made;

means for inviting the person making the call to enter an identifier for a terminal through which the line passes; and means for storing the calling line identity and the terminal identifier in a database.

BRIEF DESCRIPTION OF THE DRAWINGS

This invention will now be described in more detail, by way of example, with reference to the drawings in which:

FIGS. 6A–6F provide is a flow chart of the main program used in the test apparatus shown in FIG. 3; and FIG. 7 is a flow chart showing the program used in a database for comparing new and existing routing data.

DETAILED DESCRIPTION OF EXEMPLARY EMBODIMENTS

Figure 1:
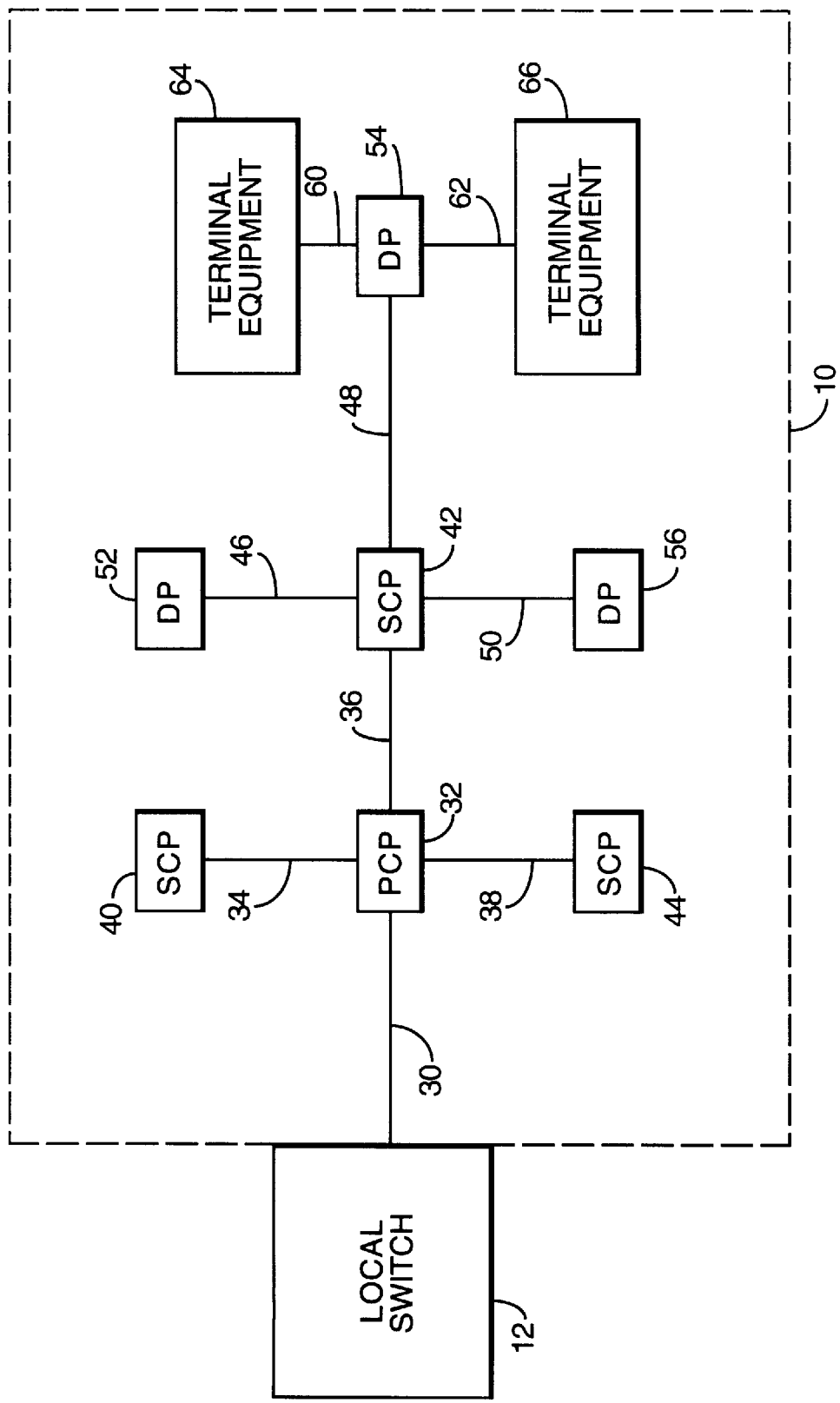
FIG. 1 is a block diagram of an access network and associated local switch which form part of a telecommunications network in which the present invention may be used.
Figure 4:
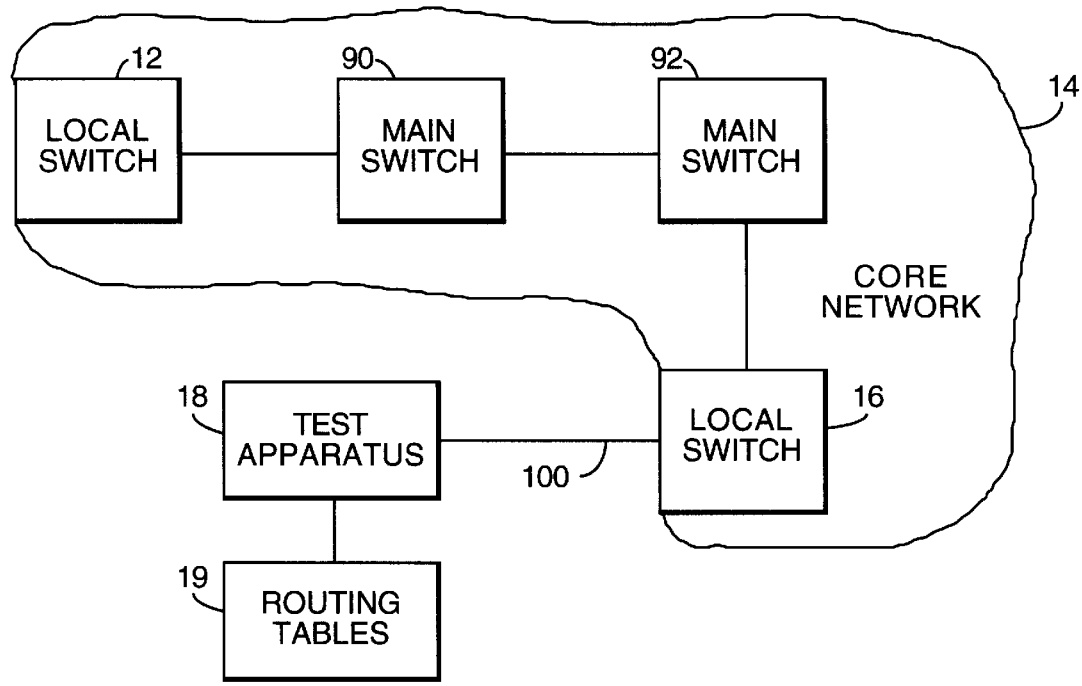
FIG. 4 is a block diagram showing the local switch of FIG. 1, part of the core network of the telecommunications network and a test apparatus embodying this invention.

Referring to FIG. 1, there is shown an access network 10 forming part of a public telecommunications network. The access network 10 is connected to a local switch 12. As shown in FIG. 4, the local switch 12 forms part of the core network 14 of the public telecommunications network. The core network 14 includes other local switches including a local switch 16. The local switch 16 is connected to a centralised test apparatus 18.

The test apparatus 18 permits a field engineer to test lines in the access network 10 and maintain routing data. Specifically, when a field engineer wishes to check the identity of a pair of wires forming a line in the access network, he dials the test apparatus 18 which then returns the identity of the line to him in speech form. The test apparatus 18 can also be used to perform a ring-back test, a test in which a quiet line termination is applied to a line, and to arrange for a test tone to be applied to a line specified by a field engineer to assist in cable pair identification in the access network.

Before describing the test apparatus 18 in detail, the access network 10, the local switch 12 and the core network 14 will be described in further detail.

Referring now to FIG. 1, the local switch 12 is connected to the terminating lines of the public telecommunications network for the area which it serves. Typically a local switch is connected to several thousand terminating lines. Each terminating line passes through several junctions before reaching its respective terminal equipment.

Each terminating line is formed from a pair of copper wires. The copper wires leave the local switch 12 in the form of one or more cables. One of these cables is shown in FIG. 1 and indicated by reference numeral 30. The far end of cable 30 from switch 12 is connected to a primary cross-connect point (PCP) 32 which may be housed in a street cabinet or underground junction box. From the primary cross-connect point 32, the terminating lines branch out as cables in several directions. For reasons of simplicity, in FIG. 1 there are shown only three cables 34, 36 and 38 leaving the primary cross-connect point 32. The far ends of cables 34, 36 and 38 from the primary cross-connect point 32 are connected, respectively, to secondary cross-connect points (SCPs) 40, 42 and 44. For reasons of simplicity, the continuation of the terminating lines beyond secondary cross-connect points 40 and 44 is not shown.

The secondary cross-connect point 42 is housed in a junction box which may be located above or below the ground. From the secondary cross-connect point 42, the terminating lines branch out again in several directions in the form of cables. By way of illustration, FIG. 1 shows cables 46, 48 and 50 leaving secondary cross-connect point 42. The far ends of cables 46, 48 and 50 from secondary cross-connect point 42 are connected, respectively, to distribution points (DPs) 52, 54 and 56. For reasons of simplicity, the terminating lines beyond distribution points 52 and 56 are not shown.

Distribution points are implemented as junctions boxes which are typically located on telephone poles. From each distribution point, the terminating lines branch out as single copper cable pairs to the premises where terminal equipment are located. By way of illustration, FIG. 1 shows two single copper cable pairs 60, 62 leaving the distribution point 54. The far ends of cables 60 and 62 are connected, respectively, to terminal equipment 64 and 66. As is well known, terminal equipment may take various forms. For example, terminal equipment may be a public telephone located in a public telephone box, a telephone instrument located in a domestic house or an office, or a fax machine or a computer located in customers' premises.

Figure 2:
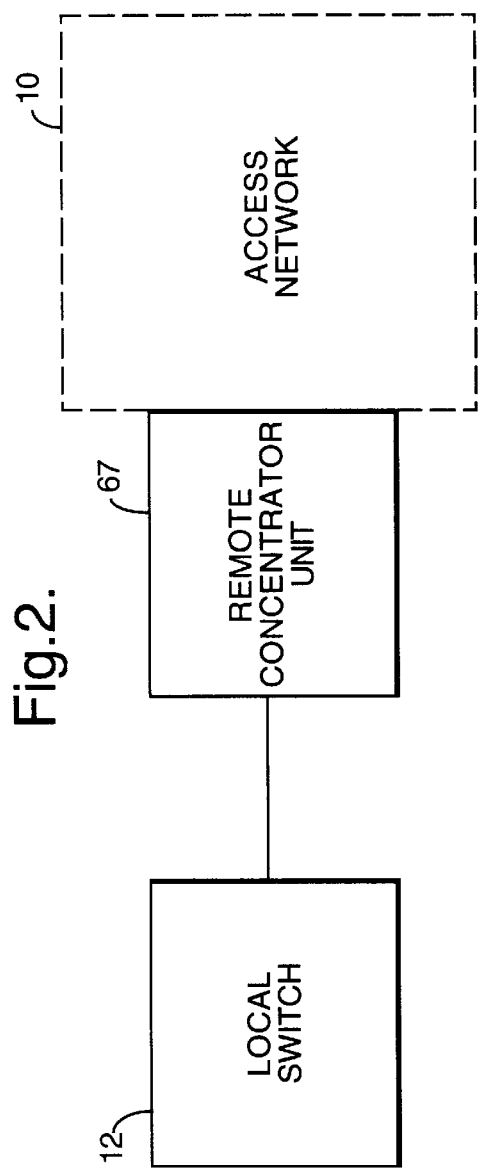
FIG. 2 is a block diagram showing a remote concentrator unit between a local switch and an access network.

Referring now to FIG. 2, there is shown an alternative arrangement in which there is a remote concentrator unit 67 between the local switch 12 and the access network 10.

Where a local switch is connected directly to the terminating line, the access network commences on the terminating lines side of the main distribution frame of the local switch. Where there is a remote concentrator unit, the access network commences on the terminating lines side of the main distribution frame of the remote concentrator unit.

The main distribution frame and junctions in the form of primary cross-connect points, the secondary cross-connect points and the distribution points all represent nodes where a field engineer may want to perform line testing. For some terminating lines, secondary cross-connect points are not used while other terminating lines may pass through additional junctions. At a junction or at the termination of a line or on a main distribution frame, a field engineer may wish to check on the identity of a line. For example, the record relating to a junction may contain errors relating to the identity of lines with the result that an engineer cannot rely always on the record of a junction to determine the identity of a particular line. There are also occasions when an engineer wishes to trace a line over all or part of its path from the local switch to its termination.

Figure 3:
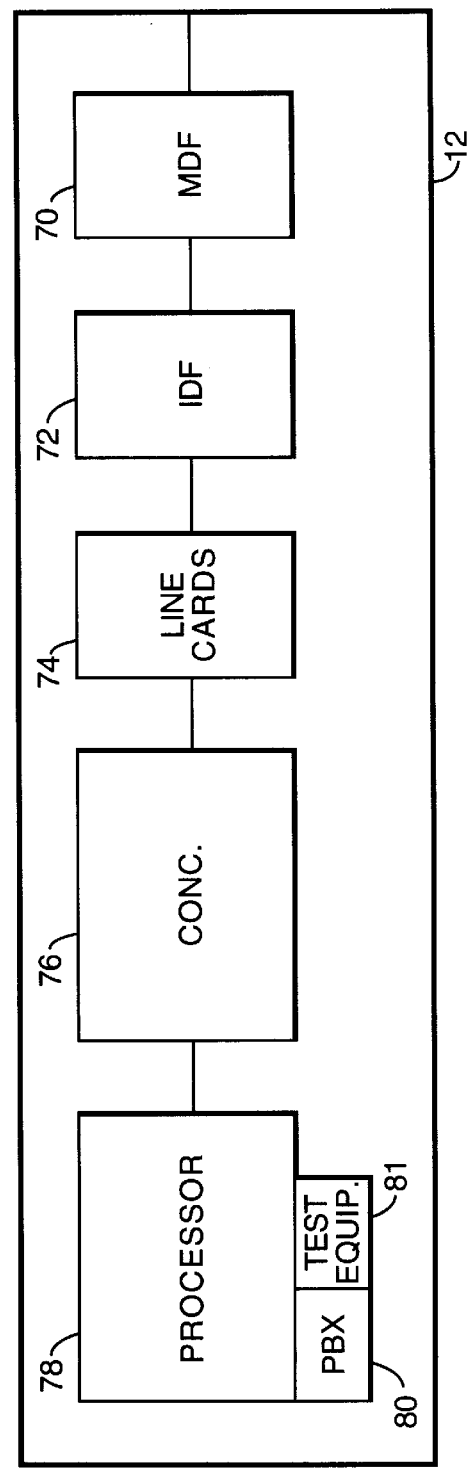
FIG. 3 is a block diagram showing the components of the local switch of FIG. 1.

In the present example, the local switch 12 is a System X switch manufactured by GEC Plessey Telecommunications Limited. The main components of the switch 12 are shown in FIG. 3. In the switch 12, the cables from the access network as well as cables from the core network are connected to a main distribution frame (MDF) 70. From the main distribution frame 70, the lines are cross-connected to an intermediate distribution frame (IDF) 72. From the intermediate distribution frame 72, each line is connected to a respective one of a bank of line cards 74. From the line cards 74, lines are connected to a concentrator 76 and the output lines from the concentrator 76 are connected to a processor 78. The processor 78 performs the main switching function of the switch 12.

The switch 12 includes a private branch exchange 80. The private branch exchange 80 is connected to test equipment 81 which has its own telephone number. The test equipment 81 provides various facilities including test facilities. One of these test facilities is the provision of a test tone for use in cable pair identification. In order to obtain the test tone, a field engineer dials the telephone number of the test equipment 81, then the code number for requesting the provision of a test tone, and then the telephone number of the line on which the test tone is required. The test equipment 81 then connects a test tone at 800 Hz to the telephone line specified by the field engineer. The tone is removed when a call is made. If the engineer dials in on one of the terminating lines of the switch, he can access the test equipment 81 by dialling its short code.

The local switch 12 is only one of many local switches of the public telecommunications network. In a large network, there may be many hundreds of local switches. Each local switch is connected to two main switches. The reason for connecting the local switch to two main switches, rather than one, is to provide security.

Referring now to FIG. 4, there is shown the core network 14. For reasons of simplicity, only two main switches, designated by reference numerals 90 and 92 are shown in the core network 14. However, in a large public telecommunications network there are a large number of fully interconnected main switches. For example, in BT's UK public telecommunications network, there are more than sixty main switches. FIG. 4 shows the connection of the local switch 12 to the main switch 90 and, for reasons of simplicity, the connection of the local switch 12 to a second main switch is omitted.

FIG. 4 shows a further local switch 16. The local switch 16 is connected to the main switch 92. The connection of the local switch 16 to a second main switch in the core network 14 is omitted for reasons of simplicity.

The test apparatus 18 is connected by a telecommunications link 100 to the local switch 16. In the present example, the telecommunications link 100 is a thirty channel ISDN link. The test apparatus can serve up to 15 users simultaneously. The test apparatus 18 has its own telephone number and may be accessed simply by dialling its telephone number from any point in the telecommunications network. The test apparatus 18 may also be accessed by dialling a short code which is then translated into the full telephone code for the test apparatus 18 in the local switch connected to the line from which the call is made. Thus, the test apparatus 18 forms a centralised test apparatus for the whole network.

Figure 5:
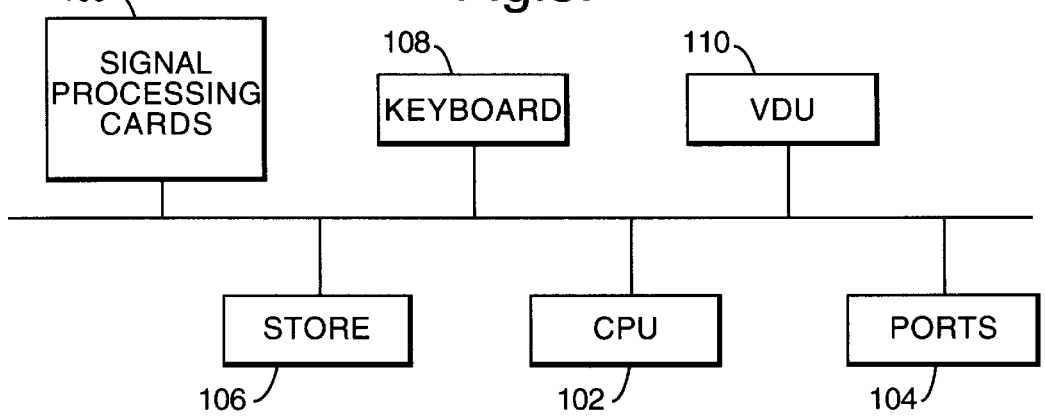
FIG. 5 is a block diagram of the components of the test apparatus of FIG. 4.
Figure 6A:
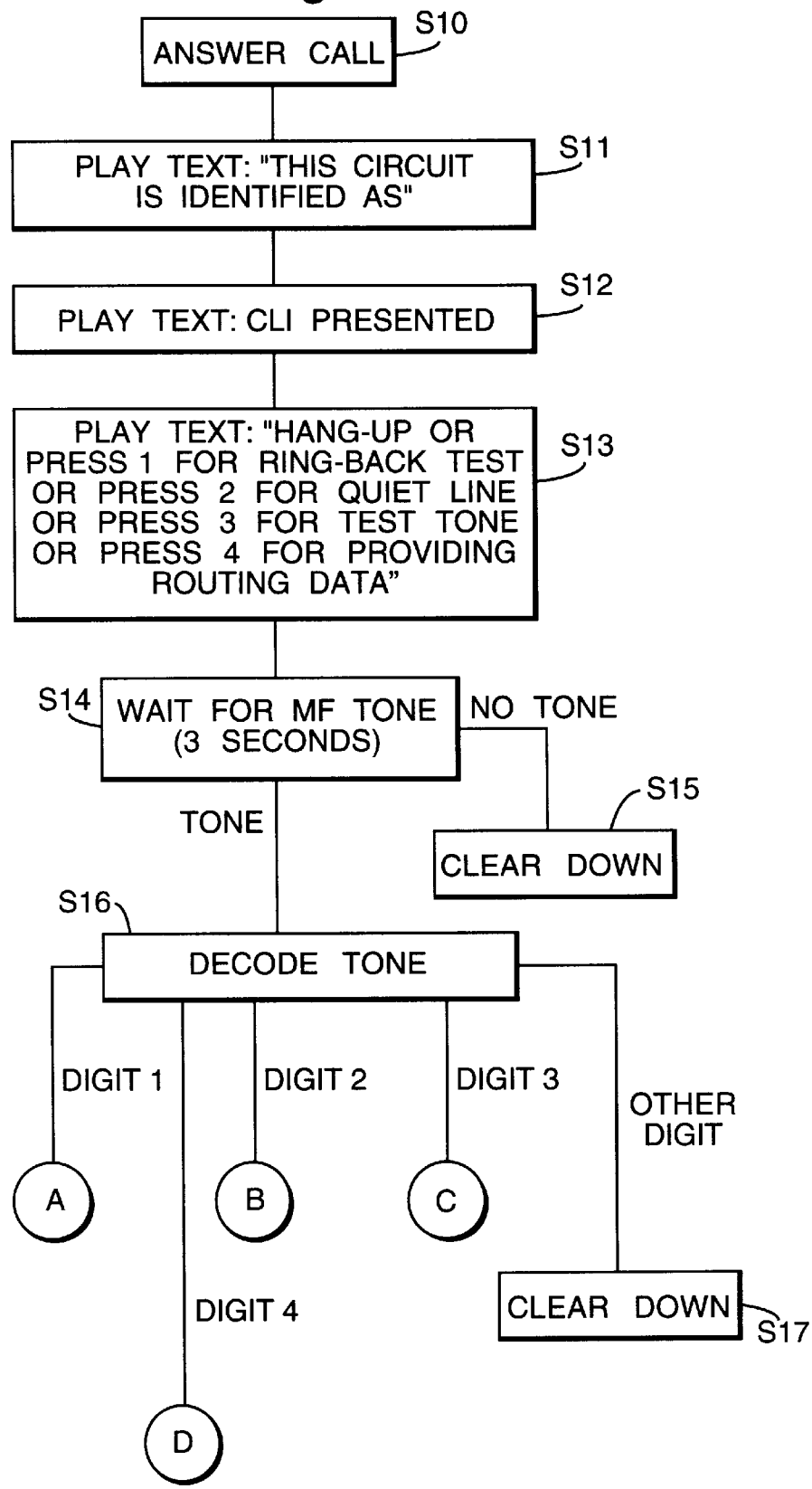
Figure 6E:
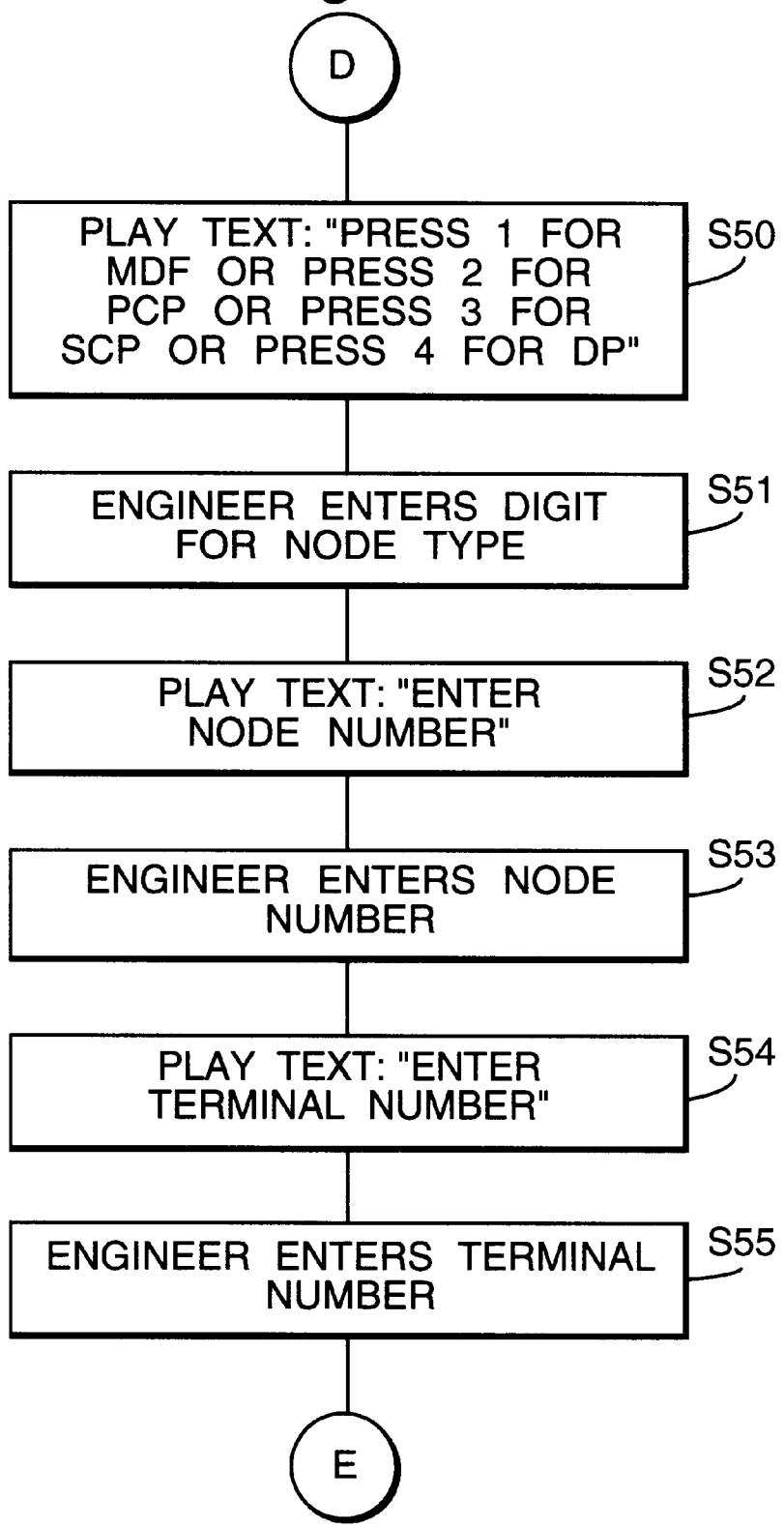

In the present example, the test apparatus 18 is implemented as a computer, the components of which are shown in FIG. 5. Referring now to FIG. 5, the components of the computer which forms test apparatus 18 comprise a central processing unit (CPU) 102, a set of ports 104 for connecting the computer to the telecommunications link 100, a store 106, a keyboard 108, signal processing cards 109 and a visual display unit (VDU) 110. The signal processing cards 109 include a speech synthesiser card, a multi-frequency detector card and a multi-frequency generator card.

The store 106 is formed from hard disk memory, read only memory (ROM) and random access memory (RAM). The store 106 contains the program for controlling the computer.

A computer of the type shown in FIG. 5 is available from Aculab plc of Lakeside, Bramley Road, Mount Farm, Milton Keynes under the name Millennium CT.

The test apparatus 18 is connected to a database 19 which contains routing tables for terminating lines of the access networks of the public telecommunications network.

In the telecommunications network described in this example, the calling line identity of the calling line is transmitted at the beginning of each call to the called line. The calling line identity is also transmitted in the signalling channel of a 30 channel ISDN link. Thus, at the beginning of a call, terminal equipment attached to the end of a single line or the end of a 30 channel ISDN link can retrieve the calling line identity.

Referring now to FIGS. 6A–6F, there is shown a flow chart of the main program used in test apparatus 18. The test apparatus 18 runs the main program for each call which is made to it.

After entering the main program, in a step S10, the test apparatus answers the call. At the beginning of step S10 it also retrieves the calling line identity of the line from which the call was made from the signalling channel of the ISDN link. Immediately after step S10, in a step S11, it plays the following text to the line from which the call was made: "this circuit is identified as". Immediately after performing step S11, in a step S12, it plays the number of the line from which the call was made.

By way of modification, the test apparatus 18 may be placed at the end of an ordinary single telephone line. With this modification, it retrieves the calling line identity which is transmitted at the beginning of the call.

Thus, as a result of performing steps S10 to S12, the number of the line from which the call was made is transmitted back to the calling line and so to the calling party in speech form. Thus, by dialling the test apparatus 18, a field engineer may identify a line at a junction point or terminal point in the access network.

Speech form is a particularly convenient way of presenting the calling line identity as it permits a field engineer to obtain the calling line identity merely by using an ordinary telephone instrument and without the need of special equipment.

After performing step S12, in a step S13, the test apparatus plays the following text: "hang-up or press 1 for ring back test or press 2 for quiet line or press 3 for test tone or press 4 for proving routing data". Thus, in step S13, the test apparatus is offering a menu which comprises four further services. The first of these services is a ring back test which may be obtained simply by pressing numeral 1 on a telephone instrument. The second service is the provision of a quiet line which may be used to test for the presence of noise and which may be obtained simply by pressing numeral 2 on a telephone instrument. The third service is the provision of a test tone which may be obtained simply by pressing numeral 3 on a telephone instrument. The fourth service is the opportunity to provide routing data.

After step S13, in a step S14, the test apparatus 18 awaits the return of a multi-frequency (MF) tone from the calling line. (As is well known, in a modern telecommunications network, when a number key is pressed on a telephone handset, the number is transmitted as a multi-frequency tone). If no tone is received within three seconds, the test apparatus 18 clears down the call.

If a multi-frequency tone is received, then in a step S16, the test apparatus 18 decodes the tone. If the tone is decoded as a digit other than 1 or 2 or 3 or 4, the test apparatus 18 clears down the call in a step S17.

If the tone is decoded as digit 1, then in a step S18, the test apparatus plays the following text: "ring back test please hang up". Thus, in step S18, the test apparatus invites the user on the calling line to hang up to obtain a ring back test.

In a step S19, the test apparatus waits for the user to hang up. If the user does not hang up within ten seconds, the test apparatus proceeds to step S20 where it waits for a further ten seconds. At the end of this ten second period, it proceeds to step S21 in which it plays the following text: "ring back test cancelled". Thus, in step S21, the user is advised that the ring back test is cancelled. In a step S22, the test apparatus then clears down the call.

If in step S19 the user hangs up within the ten second period, the test apparatus proceeds to step S24 in which it dials the number of the calling line so as to perform a ring back test. It then clears down the call in a step S25.

Thus, steps S18, S19 and S24 provide a ring back test on the calling line. A field engineer will request a ring back test when he wishes to test the ability of the calling line to receive calls or to test a telephone bell. The ring back test will also increase the engineer's confidence that the calling line has been identified correctly.

If in step S16 the tone is decoded as digit 3, the program proceeds to step S27. In step S27, the test apparatus plays the following text: "enter number of line to be tested". Thus, step S27 is an invitation to the user to specify the line on which a test tone is required. It should be noted that the user is free to request a test tone on any terminating line of the network and not just the line on which he is calling. For example, where a user wishes to request a test tone on a particular terminating line connected to a particular local switch, he may dial in on a terminating line connected to another local switch or from a mobile phone. Thus, an engineer working on a junction box located on a pole may use his mobile phone to obtain a test tone on a specified line.

After step S27, in a step S28, the test apparatus waits for three seconds to receive the number of the line to be tested. If no number is received within the three second period, in a step S29 the test apparatus clears down the call.

If a number is received within the three second period, the program continues with a step S30. The number will be transmitted as a series of multi-frequency tones and these tones are decoded in step S30.

The store 106 of test apparatus 18 contain a database which relates the numbers of the terminating lines of the network to the numbers of the test equipment of the local switches of the network. Thus, for each telephone number of a terminating line, the database has the number of the test equipment of the local switch to which that terminating line is connected. For example, for a terminating line having the telephone number: "0171 728 7915", the telephone number of the test equipment of the switch to which that terminating line is connected could be: "0171 728 0001".

After performing step S30, in a step S31, the program accesses the database and obtains the number of the test equipment of the local switch for the line to be tested.

Then, in a step S32, it dials that test equipment.

Each test equipment is arranged to return a dial tone when it answers a call. In a step S33, the test apparatus 18 awaits the dial tone from the test equipment. If the dial tone is not received within five seconds, in a step S34, it clears down the call.

If the dial tone is received, in a step S35, it dials the code for the test tone followed by the number of the line to be tested. The code for the test tone amounts to an instruction to the test equipment to provide the test tone facility for the number which follows. The test equipment then provides a test tone on the line to be tested. As mentioned above, the test tone will be applied continuously until a call is made or answered on the line being tested.

Lastly, in a step S36, the test apparatus plays the following text: "test tone applied". Thus, the user is advised that the test tone is now being applied.

The test apparatus 18 then clears down the call.

The provision of a database which relates the numbers of the terminating lines to test equipment for the local switches to which the terminating lines are connected releases field engineers from the need to know the numbers of the test equipment.

By way of notification, the test apparatus may have a special telephone number for use where a test tone is required. With this modification, on answering a call, the program commences at step S27.

If in a step S16 the tone is decoded as digit 3, the program proceeds to step S38. In step S38, the test apparatus plays the following text: "Quiet line test". Then, in a step S39, it applies the correct termination to the line to achieve a quiet line. The test enables the user to check the line for the presence of noise.

If the tone is decoded as digit 4, the test apparatus then provides the field engineer with an opportunity to provide routing data. This service will be described below with reference to steps S50 to S58.

As mentioned above, the test apparatus 18 is connected to a database 19 which contains routing tables. The database 19 is a central database of routing tables for all the access networks in a particular zone of the public communications network. For a small public communications network, a single database could contain the routing tables for all the access networks.

In the database 19, the line number of each terminating line is recorded against an identifier for each node and identifiers for the terminals within each node through which the line passes. In each node, a line is connected to a first terminal on the exchange side and a second terminal on the terminal equipment side and these two terminals are connected together within the node. The data recorded in the routing tables can be used for line provision, maintenance and repair. However, owing to errors in recording the data, routing tables are not usually accurate. When an engineer has opened a particular node, the routing data service provides the engineer with an opportunity to update and maintain the data in the routing tables. Thus, where an engineer has opened a node for a particular task, for example a repair task or a line provision task, he can at the same time take advantage of the routing data service to update the routing data.

At the beginning of the routing data service, in a step S50, the test apparatus plays the following message:

"Press 1 for MDF or press 2 for PCP or press 3 for SCP, press 4 for DP".

The abbreviations "MDF", "PCP", "SCP" and "DP" stand for main distribution frame, primary- cross connect point, secondary cross-connect point and distribution point. Thus, step 50 is an invitation to the engineer to enter an identifier for the type of node.

Then, in a step S51, the engineer enters a digit for the node type.

Next, in a step S52, the test apparatus plays the following text:

"Enter node number". Each node in an access network is an assigned number and so step S52 is an invitation to the field engineer to enter an identifier for the node. In a step S53, the engineer enters the node number.

In a step S54, the test apparatus plays the text:

"Enter terminal number". Thus, the step S54 is an invitation to the engineer to enter the number of one of the terminals through which the line passes. As mentioned above, each line passes through a pair of terminals in each node and the terminals are connected together within the node.

In a step S55, the engineer enters the terminal number.

In a step S56, the test apparatus plays a "thank you" message and clears down in a step S57.

Lastly, in a step S58, the test apparatus transmits the CLI, node type, node number and terminal number to the database 19.

At periodic intervals, for example, nightly, the database 19 compares the new and existing data. The program for this is shown in FIG. 7 and this will now be described.

In this program, initially in a step S70, new routing data entered by field engineers is compared with existing routing data. Then, in a step S71 a report is generated of differences between new and existing data.

This report is then studied by an operator who takes appropriate action. For example, if there is an error in the routing of a terminating line, the operator can instruct a field engineer to perform appropriate operations to correct the error. If the report reveals a presence of previously unknown unassigned terminating lines, these can be used as required for line provision. The existence of unknown and unassigned terminating lines can cause unnecessary costs in line provision.

What is claimed is:

1. A method of maintaining routing data identifying the physical circuit node interconnection terminals through which a given communication line circuit passes in a telecommunications network which comprises at least one switch and a test apparatus having a predefined telephone number, said method comprising the steps of:

dialing the predefined telephone number of said test apparatus from a telephone instrument connected to a terminal in a node of a telephone line circuit through which the line passes;

said test apparatus retrieving the calling line identity data of the line circuit from which the call is made and which therefore passes through said terminal to which the telephone instrument is connected;

said test apparatus inviting the user of said telephone instrument to enter an identifier for a terminal through which said telephone line circuit passes;

said user entering an identifier for one of a pair of terminals within said node through which said telephone line circuit passes; and said test apparatus storing the calling line identity and the terminal identifier entered by said user in a database containing a routing table storing routing data in which the calling line identity for each line circuit is recorded against identifiers for the terminals within the nodes through which the line passes.

2. A method as in claim 1 in which the terminal identifier comprises an identifier for the node type, an identifier for the node number and an identifier for the terminal number to be associated with the retrieved calling line identity data.

3. A method as in claim 1 further comprising the additional steps of:

comparing new routing data entered into the database with pre-existing routing data; and generating a report on differences between said new and pre-existing data.

4. A method as in claim 1 in which:

said network has a plurality of switches and said test apparatus is connected to one of said switches; and after the user of the telephone instrument has dialed the predefined telephone number, the call from the telephone instrument is routed through the network to said test apparatus.

5. In a telecommunications network comprising at least one switch arranged to make connections between terminating line circuits connected to said at least one switch, a test apparatus having a predefined telephone number and database, said test apparatus comprising:

means for answering a call and arranged to retrieve the calling line identity data of the line circuit from which the call is made;

means for inviting a person making the call to enter identifier data for a terminal through which the calling line circuit passes; and means for storing the retrieved calling line identity data and the terminal identifier data in a database containing a routing table storing routing data in which the calling line identity for each line circuit is recorded against identifiers for the terminals within the nodes through which the line passes.

6. A test apparatus in claim 5, in which the terminal identifier data comprises identifier data for a node type, identifier data for a node number and identifier data for a terminal number through which the calling line circuit passes.

7. A test apparatus as in claim 5, further including:

means for comparing new routing data entered into the database with pre-existing routing data already in said database for the same calling line circuit; and means for generating a report on differences between the new and pre-existing routing data.

8. A method for capturing routing data in a telecommunications network identifying interconnection terminals through which cable wire pairs are interconnected to provide a fixed composite line circuit between a local switch and terminating user equipment, said method comprising:

(a) calling a pre-determined telephone number to a centralized test apparatus from a test apparatus connected to an intermediate one of said interconnection terminals for a given fixed composite line circuit;

(b) capturing calling line identity data associated with said composite line circuit at said test apparatus;

(c) entering terminal identifying data via said local test apparatus for transmission to the centralized test apparatus over at least a portion of said composite line circuit; and (d) storing said terminal identifying data in a memory in association with said identified composite calling line circuit in a data base containing a routing table storing routing data in which the calling line identity for each line circuit is recorded against identifiers for the terminals within the nodes through which the line passes.

9. A method as in claim 8 further comprising:

comparing the terminal identifying data stored in step d with terminal identifying data previously stored in association with said identified composite calling line circuit; and generating a report revealing differences between the compared data.

10. Apparatus for capturing routing data in a telecommunications network identifying interconnection terminals through which cable wire pairs are interconnected to provide a fixed composite line circuit between a local switch and terminating user equipment, said method comprising:

(a) means for calling a predetermined telephone number to a centralized test apparatus from a test apparatus connected to an intermediate one of said interconnection terminals for a given fixed composite line circuit;

(b) means for capturing calling line identity data associated with said composite line circuit at said test apparatus;

(c) means for entering terminal identifying data via said local test apparatus for transmission to the centralized test apparatus over at least a portion of said composite line circuit; and (d) means for storing said terminal identifying data in association with said identified composite calling line circuit in a data base containing a routing table storing routing data in which the calling line identity for each line circuit is recorded against identifiers for the terminals within the nodes through which the line passes.

11. Apparatus as in claim 8 further comprising:

means for comparing the terminal identifying data stored in step d with terminal identifying data previously stored in association with said identified composite calling line circuit; and means for generating a report revealing differences between the compared data.

* * * * *